United States Patent [19]

Owens et al.

[11] Patent Number: 5,733,517
[45] Date of Patent: Mar. 31, 1998

[54] BYPRODUCT SOLIDS CRYSTAL MODIFICATION WITH ORGANIC ACIDS IN WET FLUE GAS DESULFURIZATION SYSTEMS

[75] Inventors: David R. Owens, Mountain View; Robert E. Moser, Palo Alto, both of Calif.; Gordon Maller, Louisville, Ky.

[73] Assignee: Electric Power Research Institute, Palo Alto, Calif.

[21] Appl. No.: 699,196

[22] Filed: Aug. 19, 1996

Related U.S. Application Data

[63] Continuation of Ser. No. 398,688, Mar. 6, 1995, abandoned.
[51] Int. Cl.$^6$ .................................................. C01B 17/20
[52] U.S. Cl. .................................. 423/242.3; 423/243.05
[58] Field of Search ........................... 423/242.3, 243.05

[56] References Cited

U.S. PATENT DOCUMENTS

| | | |
|---|---|---|
| 3,632,306 | 1/1972 | Villiers-Fisher et al. . |
| 4,222,993 | 9/1980 | Holter et al. ................ 423/243 |
| 4,294,807 | 10/1981 | Randolph .................... 423/242 |
| 4,454,101 | 6/1984 | Garrison et al. . |
| 5,246,679 | 9/1993 | Moser et al. . |

OTHER PUBLICATIONS

DuPont Chemicals, Wilmington, DE, "Dibasic Acid (DBA)" (Date unknown).

Monsanto Chemical Co., St. Louis, MO, "AGS Mixture (50%)" (May 10, 1993).

Monsanto Chemical Co., St. Louis, MO, "Monsanto Adipic Acid and 50% AGS Mixture for Flue Gas Desulfurization (FGD)" (May 10, 1993).

*Primary Examiner*—Deborah Jones
*Assistant Examiner*—Amy M. Harding
*Attorney, Agent, or Firm*—Sixbey, Friedman, Leedom & Ferguson, P.C.; Donald R. Studebaker

[57] ABSTRACT

A wet, calcium-based flue gas desulfurization process conducted under inhibited oxidation conditions and in the presence of at least one organic acid which both enhances the efficiency of sulfur dioxide removal and modifies the crystal habit of calcium sulfite crystals to produce large, thick, regular, easily dewatered calcium sulfite hemihydrate byproduct solids is provided. The addition of an organic acid, preferably a carboxylic acid, to the flue gas desulfurization process produces calcium sulfite crystals that closely resemble calcium sulfate or gypsum crystals in settling and dewatering properties.

5 Claims, 5 Drawing Sheets

BYPRODUCT SOLIDS CRYSTAL MODIFICATION WITH ORGANIC ACIDS IN WET FLUE GAS DESULFURIZATION SYSTEMS

This application is a Continuation of Ser. No. 08/398,688, filed Mar. 6, 1995, now abandoned.

TECHNICAL FIELD

The present invention relates generally to wet flue gas desulfurization processes and systems and specifically to the use of organic acids to modify byproduct solids crystals in a wet flue gas desulfurization system conducted under inhibited oxidation conditions.

BACKGROUND OF THE INVENTION

The modification of the byproduct solids produced by flue gas desulfurization processes and systems so that these solids are thick, easily dewatered, handled and disposed of is a highly desired objective. Large, regular crystals produce solids that settle and dewater more efficiently, which results in direct savings in thickening and dewatering equipment, reduces transportation and disposal costs, and may also reduce additive costs. As disposal costs increase and available disposal sites decrease, the modification of flue gas desulfurization process byproduct solids, especially at the crystal level, has received increased attention in an effort to address the disposal problems.

When a flue gas desulfurization system is operated under forced oxidation conditions, the gypsum produced as byproduct solids is a useful commodity. These gypsum solids may be used, for example, in wallboard manufacture. As a result, the disposal of gypsum solids produced by such flue gas desulfurization processes should not present cost or disposal site problems. However, when a flue gas desulfurization process is operated under conditions where the oxidation of calcium sulfite byproduct solids to calcium sulfate or gypsum is inhibited, the removal and disposal of the calcium sulfite byproduct solids may present both cost and disposal site problems. Typically, the calcium sulfite solids produced when oxidation is inhibited to less than about 15% tend to be smaller, thinner, and more irregular or rosette in shape compared to the gypsum solids produced by a wet limestone flue gas desulfurization process conducted under forced oxidation conditions where oxidation exceeds about 98%. Small, thin, irregular crystals require large thickeners and similar equipment to provide sufficient settling area for the separation of this type of solid from liquid. In addition, special handling is required to remove entrained moisture from small irregular crystals. Larger, thicker, more regularly shaped crystals have better settling and dewatering characteristics and are much easier to separate from liquid.

Currently, many new flue gas desulfurization systems are being designed as forced oxidation systems, even though there are technical advantages accompanying an inhibited oxidation flue gas desulfurization system. The primary reason forced oxidation flue gas desulfurization systems are preferred is because the calcium sulfate or gypsum byproducts are characterized by relatively large, regular crystals that are easily dewatered and may be disposed of for wallboard manufacture or other applications. Gypsum solids do not present the disposal costs or logistical problems presented by the calcium sulfite hemihydrate solids produced by inhibited oxidation flue gas desulfurization systems.

The prior art has begun to address the dewatering and disposal problems which accompany the production of calcium sulfite solids by a flue gas desulfurization system conducted under conditions which inhibit oxidation. U.S. Pat. No, 4,454,101 to Garrison et al. discloses the addition of thiosulfate ion to the scrubber in a flue gas desulfurization process to produce more easily dewatered calcium sulfite solids to facilitate solid waste disposal. The thiosulfate ion concentration in the scrubbing liquor is maintained at a concentration ranging from 250 to 2500 parts per million to produce a filter cake of about 80 to 90 percent solids, which is suitable for landfill. Large, well defined, smooth individual crystals of principally calcium sulfite are stated to be produced by this process.

U.S. Pat. No. 5,246,679 to Moser et al., which is commonly owned with the present invention, discloses modifying a wet calcium-based flue gas desulfurization process to produce calcium sulfite crystals that are more easily dewatered and disposed of by the addition to the process of a small amount of a crystal growth habit modifier, preferably an organophosphonate, which inhibits nucleation to a greater extent than it inhibits crystal growth. Substantially regularly shaped calcium sulfite crystals greater than 50 microns in size are produced.

U.S. Pat. No. 3,632,306 to Villiers-Fisher et al. discloses a wet flue gas desulfurization process in which a secondary reagent is added to improve the sulfur dioxide removal from flue gas. The secondary reagent may be a free acid or an acidic salt, and solid calcium sulfite is precipitated while the acid reagent is regenerated. No mention is made, however, of modifying or otherwise affecting the calcium sulfite solids to produce larger, more regular solids that are easily dewatered and disposed of.

The prior art, therefore, has failed to suggest a method for the modification of calcium sulfite byproduct solids from a wet flue gas desulfurization process conducted under inhibited oxidation conditions which employs a processing additive used to enhance sulfur dioxide removal which also modifies calcium sulfite crystal growth to produce larger, more regular calcium sulfite solids that are easily dewatered and disposed of. Consequently, a need exists for a method for the modification of calcium sulfite byproduct solids from a wet flue gas desulfurization process conducted under inhibited oxidation conditions which employs the same additive used to enhance sulfur dioxide removal efficiency to produce large, thick, regular calcium sulfite crystals that settle, dewater and handle efficiently and are readily disposed of.

SUMMARY OF THE INVENTION

It is a primary object of the present invention, therefore, to overcome the disadvantages of the prior art and to provide a method for modifying the crystal habit of calcium sulfite byproduct solids of an inhibited oxidation wet flue gas desulfurization system with a process additive which also enhances sulfur dioxide removal efficiency.

It is another object of the present invention to provide a method for modifying a wet flue gas desulfurization process conducted under inhibited oxidation conditions to produce large, regular calcium sulfite solids that are easily dewatered and disposed of.

It is a further object of the present invention to provide an inhibited oxidation wet flue gas desulfurization process which produces large, regular calcium sulfite crystals which resemble calcium sulfate or gypsum crystals in their settling, dewatering and handling properties while concomitantly enhancing sulfur dioxide removal.

It is still another object of the present invention to provide an inhibited oxidation wet flue gas desulfurization process that can be conducted efficiently and at lower cost than currently available inhibited oxidation wet flue gas desulfurization processes.

The aforesaid objects are achieved by providing a wet flue gas desulfurization process conducted under inhibited oxidation conditions wherein both calcium sulfite crystal size and shape and sulfur dioxide removal are enhanced by the addition of an organic acid. The addition of an organic acid, preferably a carboxylic acid, significantly affects the size and shape of the calcium sulfite hemihydrate crystals resulting from this process to produce large, thick, regular easily dewatered calcium sulfite crystals. Liquor containing the organic acid may be recovered during dewatering of the crystals and returned to the flue gas desulfurization system so the acid can be reused.

Other objects and advantages will be apparent from the following description, claims and drawings.

DESCRIPTION OF THE PREFERRED EMBODIMENTS

Figure 1:
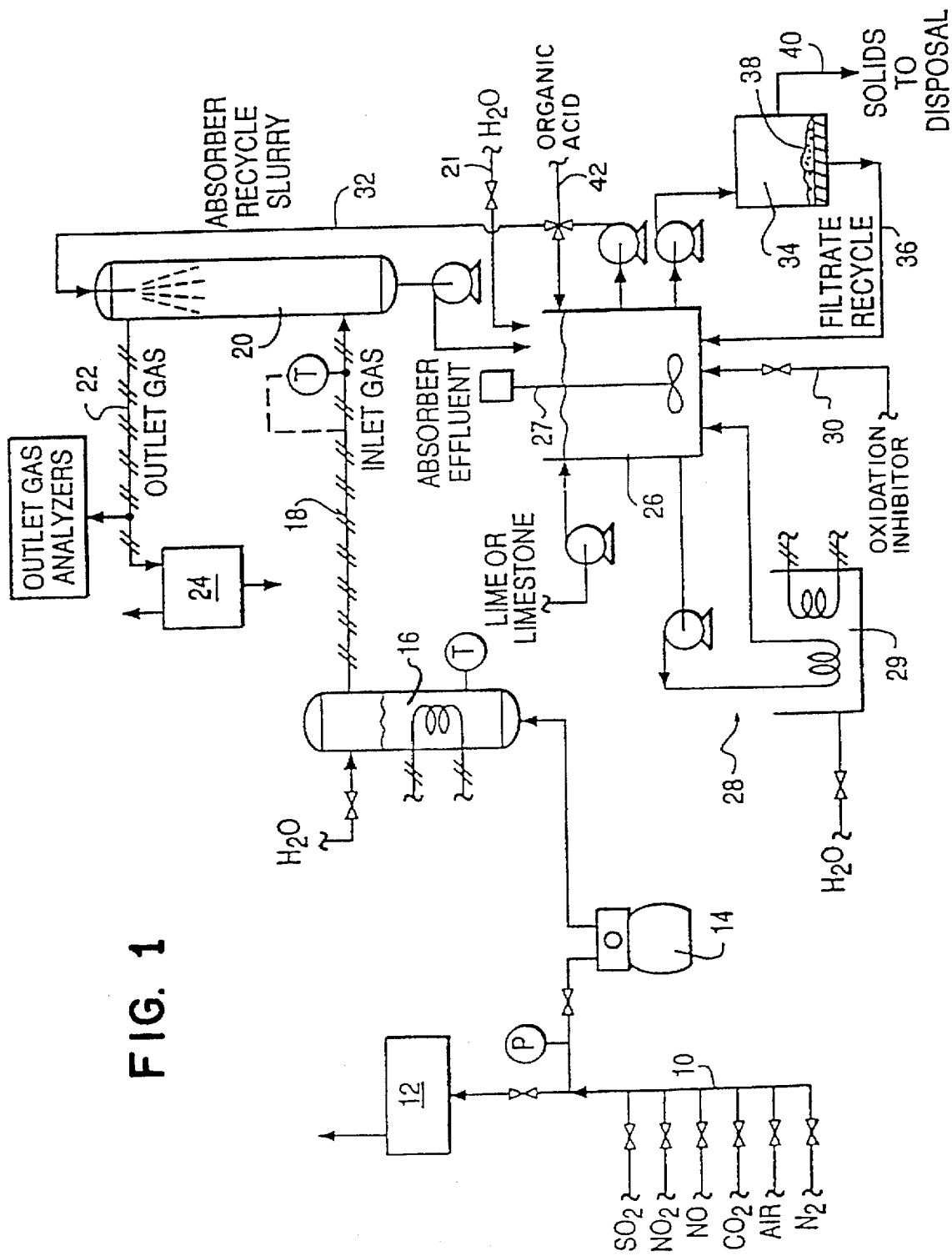
FIG. 1 is a schematic representation of a 5-ACFM bench scale wet flue gas desulfurization process with which the crystal modification method of the present invention may be used.

In wet calcium-based flue gas desulfurization processes, sulfur dioxide ($SO_2$) is absorbed from the flue gas into the liquid phase and forms calcium sulfite solids. Depending on the amount of natural oxidation which occurs, a certain amount of calcium sulfate will be formed. Crystals of calcium sulfite or calcium sulfate will form as the respective critical relative saturations for each of the compounds are exceeded in the liquid phase. If the ratio of the amount of sulfite oxidized to sulfate compared to the total amount of sulfur compounds absorbed from the flue gas is less than about 15 to 18 percent, then all of the sulfate formed will be purged from the system as a coprecipitate included within the calcium sulfite crystal matrix. Consequently, when oxidation is inhibited below the critical 15 to 18 percent, all of the calcium sulfate or gypsum formed through oxidation will be removed from the flue gas desulfurization system within the calcium sulfite crystal lattice. The flue gas desulfurization process of the present invention takes steps to positively inhibit oxidation to below the crucial 15 to 18 percent through the addition of an oxidation inhibitor.

However, even though a major advantage of operating a flue gas desulfurization system under conditions which inhibit oxidation is the elimination of gypsum scaling of the system components, many flue gas desulfurization systems are designed to operate as forced oxidation systems. This is because the calcium sulfate or gypsum solids formed by such systems are larger, more regular in shape and, thus, more easily dewatered and disposed of than calcium sulfite solids. The costs of running a flue gas desulfurization system which favors the formation of calcium sulfate byproduct solids are lower than the costs of running a system that generates calcium sulfite solids. Typically, the calcium sulfite solids produced when oxidation is inhibited tend to be smaller and more irregular or rosette in shape compared to the regular crystalline gypsum solids from forced oxidation systems. As a result, larger thickeners are required to provide sufficient settling area for these calcium sulfite solids, and more dewatering equipment is required to remove entrained moisture to a desirable level compared to what is required for a forced oxidation flue gas desulfurization system producing gypsum solids.

Additives which affect the crystal habit of solids formed during flue gas desulfurization processes have been used to produce large, regular byproduct solids crystals that may be efficiently dewatered and disposed of. Such additives are described in U.S. Pat. No. 5,246,679, owned by the present assignee, the disclosure of which is hereby incorporated herein by reference. The organophosphonates and like additives proposed in U.S. Pat. No. 5,246,679 produce large, thick, regularly shaped crystals of calcium sulfite. However, these additives function only to modify crystal size and shape and do not otherwise affect the effectiveness of sulfur dioxide removal or any other aspect of the flue gas desulfurization process.

The inventors have discovered that organic acids, in particular mono- and dibasic carboxylic acids, both enhance sulfur dioxide removal and significantly affect the crystal size and shape of calcium sulfite hemihydrate solids formed in wet limestone flue gas desulfurization systems conducted under conditions which inhibit oxidation. When organic acids are added to wet flue gas desulfurization process liquor when oxidation is inhibited, calcium sulfite hemihydrate crystals are produced that are larger, thicker and more regular or block-like in shape than calcium sulfite hemihydrate crystals produced by inhibited oxidation wet flue gas desulfurization processes to which organic acids have not been added.

Organic acids may be added to flue gas desulfurization processes to ensure that sufficient alkalinity is available to remove a maximum amount of sulfur dioxide from the flue gas. U.S. patent application Ser. No. 08/109,487, filed Aug. 20, 1993, and commonly owned by the present assignee, the disclosure of which is hereby incorporated herein by reference, describes a flue gas desulfurization process conducted under conditions which inhibit oxidation that includes the addition of an organic acid buffer. However, the effect of organic acids, particularly carboxylic acids, on the crystal habit of calcium sulfite hemihydrate solids in wet limestone inhibited oxidation flue gas desulfurization systems was not appreciated until the present invention.

The improved calcium sulfite hemihydrate solids produced by the flue gas desulfurization process of the present invention settle and dewater more efficiently, which leads to direct savings in thickening and dewatering equipment because smaller equipment can be used. In addition, the byproduct volume transported to landfill for disposal is less; therefore a savings in landfill costs is realized. Moreover, additive costs can be reduced when the organic acid additives are concomitantly used to enhance sulfur dioxide removal.

FIG. 1 illustrates, schematically, a 5-acfm bench scale flue gas desulfurization system which has been used to demonstrate the effectiveness of the present method in producing flue gas desulfurization byproduct solids, wherein the crystals are bigger and bulkier than heretofore possible, which results in improved byproduct handling and dewatering. Although the present invention is described herein primarily with respect to the performance of this process on bench scale apparatus, the process may be performed equally efficiently and effectively on full scale flue gas desulfurization apparatus equivalent to that described herein.

In the bench scale flue gas desulfurization apparatus shown in FIG. 1, synthetic flue gas containing $SO_2$ is produced by an inlet gas manifold system 10. A portion of the inlet gas is analyzed by inlet gas analyzers 12. The remainder of the $SO_2$-containing flue gas is directed to a dry gas meter 14 and then to a water saturator and heater column 16. The flue gas, which is saturated at a temperature of approximately 50° C., then flows through a heated gas line 18 where it is heated to about 190° C. and to an absorber or scrubber 20, which may be a spray tower or bubbler. The scrubbed gas flows from the absorber 20 through a heated outlet gas line 22, to an outlet gas analyzer, then to a knock-out vessel 24 and is vented or directed to a drain, as appropriate. Gas in the absorber is contacted by slurry from the reaction tank 26. Effluent from the absorber 20 and makeup water 21 are directed into a reaction tank 26 equipped with a variable speed mixer 27 for agitation. A source of calcium and alkalinity, preferably lime or limestone, is also added to the reaction tank to control pH. The contents of the reaction tank are heated in a reaction tank heater loop 28 which includes a heated water bath 29.

Oxidation is inhibited in the reaction tank by providing a constant supply of an oxidation inhibitor to the reaction tank through line 30. One especially effective oxidation inhibitor is thiosulfate ions. These may be added directly as a thiosulfate salt or formed in situ by the addition of elemental sulfur. The disclosure of commonly owned U.S. Pat. No. 4,994,246, issued on Feb. 19, 1991, which discloses one method of inhibiting oxidation in a flue gas desulfurization system, is hereby incorporated herein by reference. Although thiosulfate and thiosulfate combinations are preferred oxidation inhibitors, any oxidation inhibitor which inhibits the oxidation of calcium sulfite to calcium sulfate could also be used.

Slurry from the reaction tank may be directed to the absorber through line 32 and through the absorber back to the reaction tank 26 where a solid solution of calcium sulfite is formed. Some of the reaction tank slurry is recycled back to the absorber. The reaction tank slurry is also drained from the reaction tank and directed through an in-line filter 34 or to a centrifuge (not shown) to collect calcium sulfite solids and control the solids concentration of the slurry. The calcium sulfite solids comprise large, thick, regularly shaped crystals that are substantially similar in size and shape to gypsum crystals. The filtrate or centrate liquor is recycled through line 36 back to the reaction tank 26. The filtered calcium sulfite solids 38 are then routed through line 40 and disposed of.

A selected organic acid or organic acid mixture additive is added to the reaction tank 26 through line 42 during the flue gas desulfurization process. Preferred organic acid additives for modifying calcium sulfite crystal size and shape to produce large, thick, regular crystals are mono- and dibasic carboxylic acids. Different carboxylic acids may affect calcium sulfite crystal size and shape differently. For example, succinic acid appears to produce larger and thicker calcium sulfite crystals than the other components of DBA, a commercially available mixture of dicarboxylic acids currently used in wet flue gas desulfurization processes to enhance sulfur dioxide removal. However, other organic acids, including adipic, glutaric, formic, citric, acetic and phthalic have also been found to influence the crystal size and shape of calcium sulfite crystals to produce larger, thicker and more regularly-shaped crystals than those produced in the absence of organic acids. These acids may be used alone or in mixtures. Other similar organic acids which enhance sulfur dioxide removal are also expected to produce large, thick, regular calcium sulfite crystals in wet flue gas desulfurization systems conducted under inhibited oxidation conditions.

The calcium sulfite hemihydrate crystal system is orthorhombic with eight molecules in a unit cell. Under the conditions encountered in wet calcium-based flue gas desulfurization scrubbers when oxidation is inhibited, calcium sulfite hemihydrate is usually never precipitated in a pure form, but forms a solid solution with sulfate. The amount of sulfate substituted into the crystal lattice seems to have an effect on the shape and size of the crystals. Generally, calcium sulfite is precipitated as thin platelets from limestone-based scrubbers or as agglomerates or "rosettes" from lime-based systems. The platelet forms can vary from mostly single crystals with aspect ratios of about 1:2:20 to platelets with substantial amounts of dendritic growth. The average particle size, the length of the longest dimension, is typically 10 to 20 microns. The rosette forms are highly dendritic clusters of thin blades growing out from the center. The result is the formation of nearly spherical particles with diameters typically ranging from 10 to 50 microns.

The precipitation of a salt from an aqueous solution can proceed by two processes, namely nucleation and crystal growth. In the flue gas desulfurization system, the conditions favorable to the creation of new calcium sulfite crystal nuclei also tend to reduce average particle size. If no seed crystals are present, the calcium sulfite will precipitate at relatively high supersaturation levels as primary nucleation. However, the presence of seed crystals produces secondary or collision nucleation at substantially lower supersaturation levels. Secondary nucleation will occur in a seeded crystallizer at all relative saturations greater than 1.0. In the absence of chemical growth modifiers, the control of the amount of solids in the recirculation loop and the degree of crystal breakage or attrition are the primary variables for controlling crystal sizes.

The present invention is premised on chemically modifying the precipitation or crystal formation of calcium sulfite to change its crystal growth rate and nucleation characteristics to favor the formation of larger and thicker crystals. The addition level of the organic acid crystal modifiers is controlled to significantly reduce nucleation without completely inhibiting crystal growth. As a result, the formation of large, thick crystals is favored over the formation of small, thin crystals. Typically, precipitation inhibition by crystal modifiers occurs by one and/or two mechanisms. In one case, the organic acid additive can interact with the molecular cluster of the substance in solution and prevent the formation of stable microcrystalline nuclei. In general, the inhibition of nucleation will result in the formation of larger crystals.

In the second case, the ability of additives to alter the shape of precipitated crystals is due to the preferential absorption of the crystal modifier on certain faces of the crystal, typically the faster growing faces. Most often, the absorbed crystal modifiers tend to inhibit the rate of growth on the affected faces. This process tends to cause the other faces of the crystal to become larger relative to the affected faces. Depending upon the degree of chemical interactions, these absorbed crystal modifiers may be displaced during subsequent growth or partially entrapped into the crystal.

FIGS. 2a, 2b, 3a, 3b, 4a, 4b and 5 are photomicrographs which illustrate the changes in calcium sulfite crystal size and structure which occur when organic acid additives are added to the process liquor in a wet flue gas desulfurization system conducted under inhibited oxidation conditions. The calcium sulfite crystals are shown at 500× and 1000× magnification.

Figure 2A:
FIGS. 2a and 2b are photomicrographs illustrating calcium sulfite crystals at 500× and 1000× magnification, respectively, from a wet flue gas desulfurization process conducted without organic acid additives.
Figure 2B:
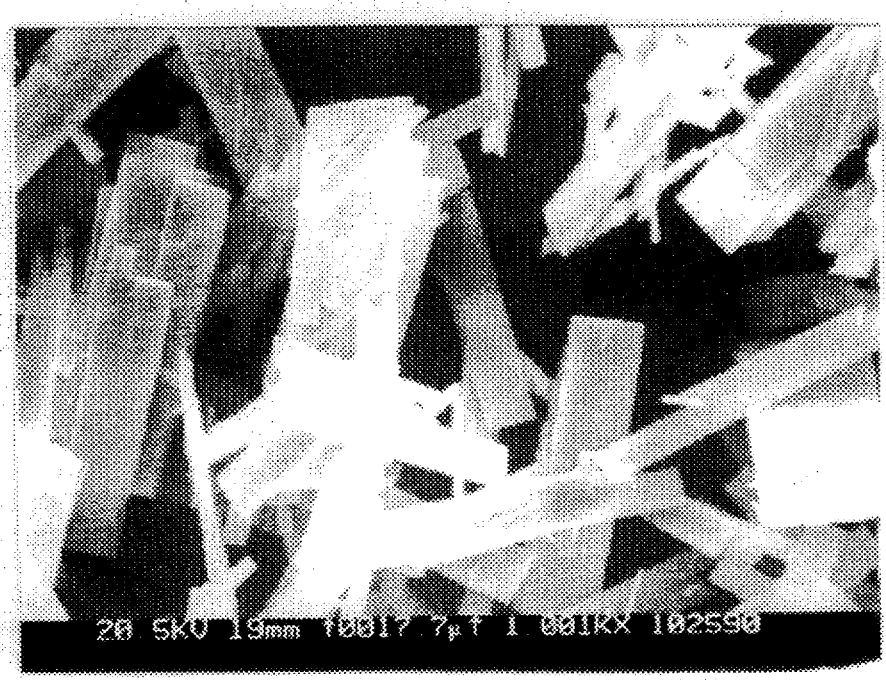
Figure 3A:
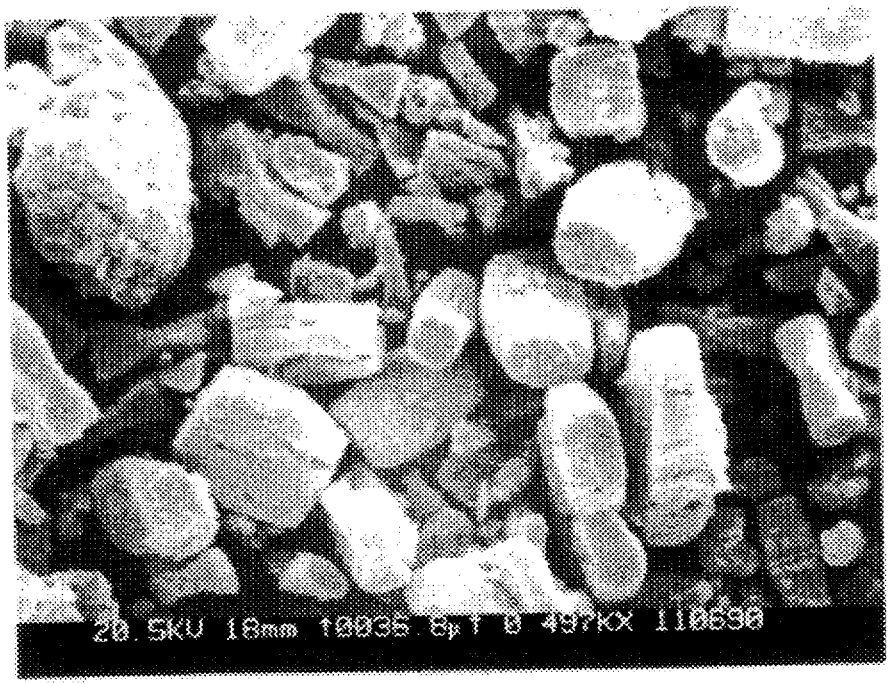
FIGS. 3a and 3b are photomicrographs illustrating calcium sulfite crystals at 500× and 1000× magnification, respectively, from a wet flue gas desulfurization process using dibasic acid (DBA) as a process additive.
Figure 3B:
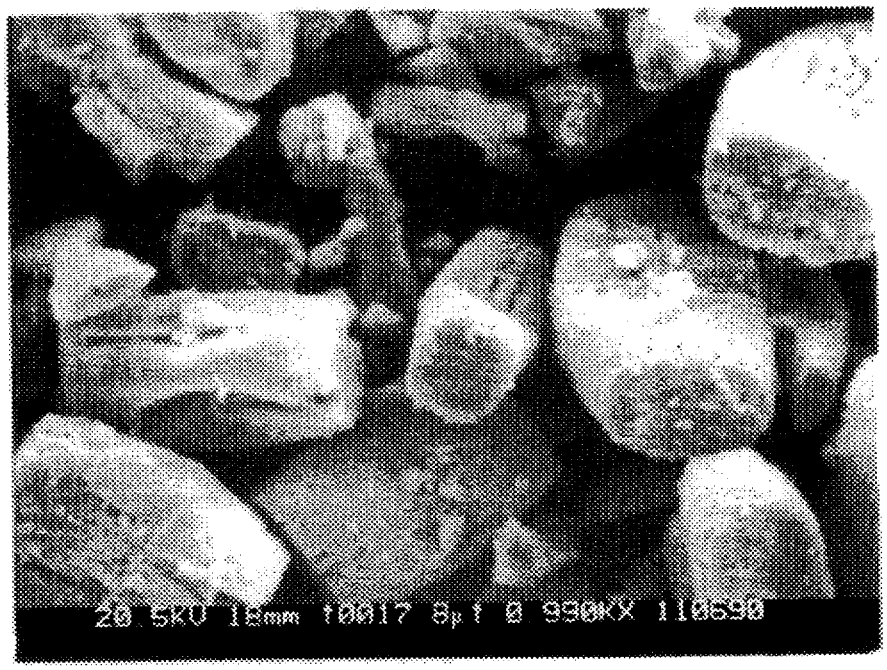
Figure 4A:
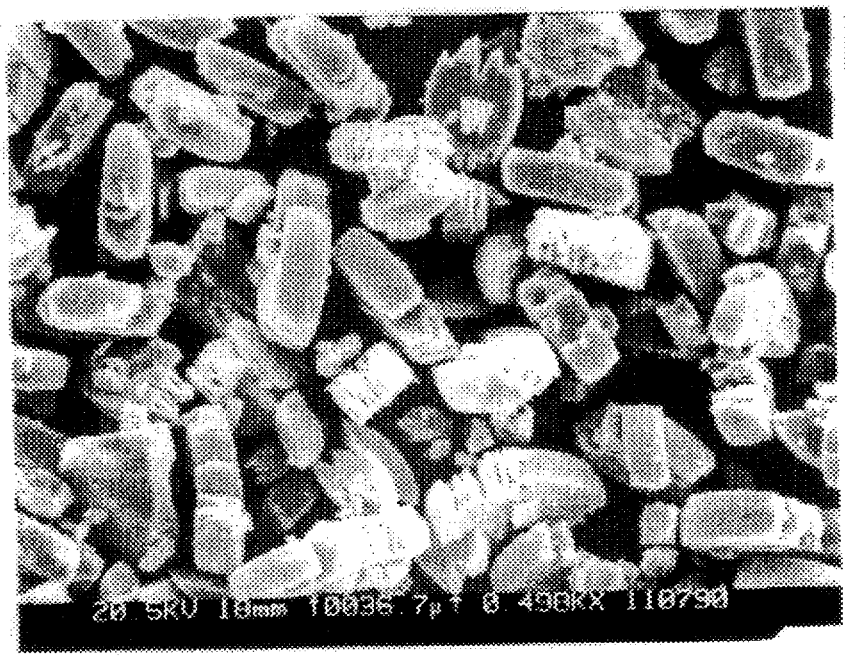
FIGS. 4a and 4b are photomicrographs illustrating calcium sulfite crystals at 500× and 1000× magnification, respectively, from a wet flue gas desulfurization process using succinic acid as a process additive.
Figure 4B:
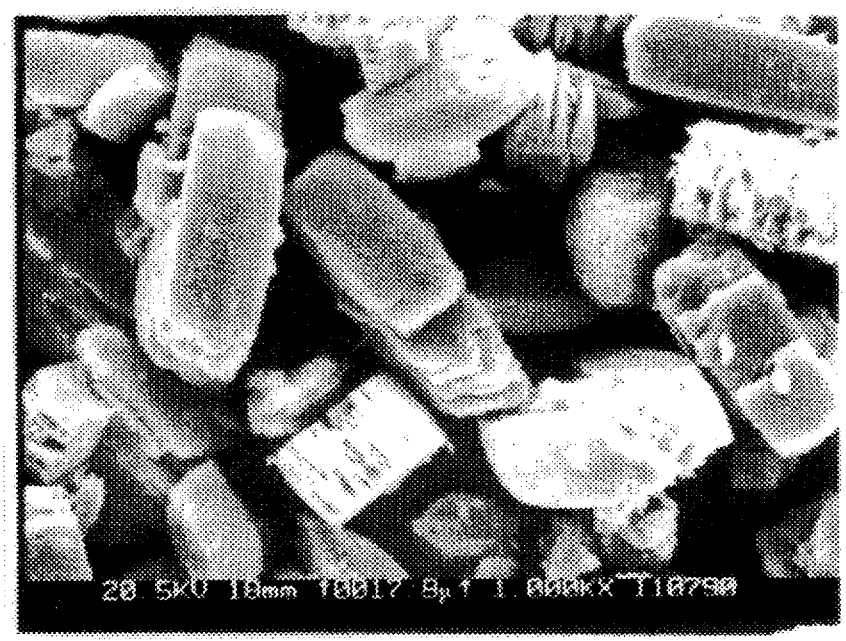
Figure 5:
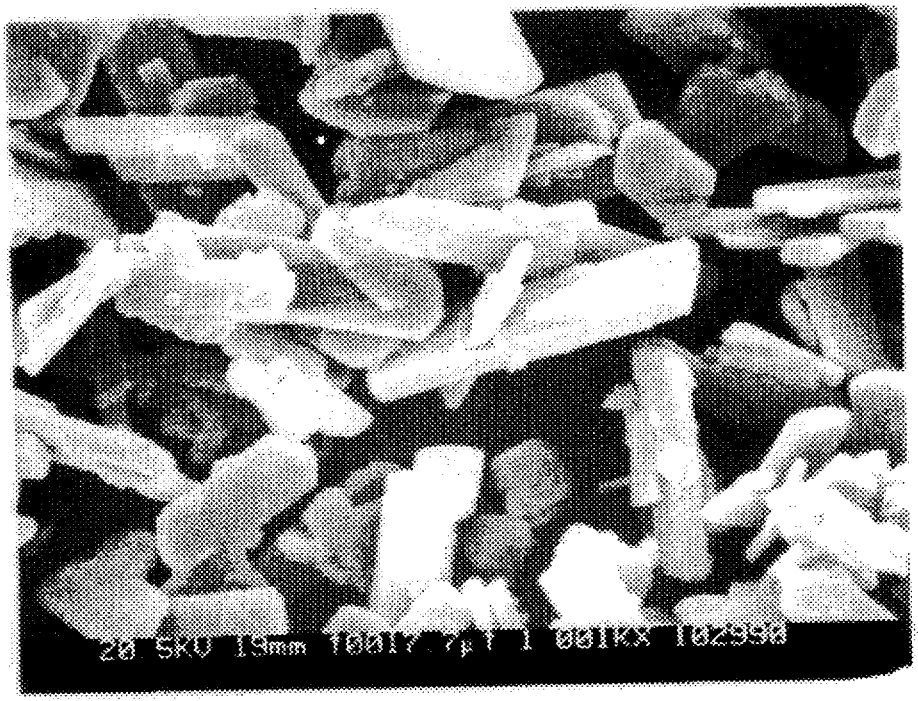
FIG. 5 is a photomicrograph illustrating calcium sulfite crystals at 1000× magnification from a wet flue gas desulfurization process using adipic acid as a process additive.

The photomicrographs of FIGS. 2a and 2b shown at 500× and 1000×, respectively, calcium sulfite crystals produced by a wet flue gas desulfurization process when no organic acid additive has been incorporated into the scrubbing or process liquid. The calcium sulfite crystals produced tend to be thin platelets that break easily to form smaller particles that are very difficult to dewater to the extent required for disposal and are also very difficult to handle.

The calcium sulfite crystals shown in the photomicrographs of FIGS. 3a, 3b, 4a, 4b and 5 present a distinct contrast to those of FIGS. 2a and 2b. Three different organic acids were used as wet flue gas desulfurization process additives to enhance sulfur dioxide removal while oxidation was inhibited. The calcium sulfite crystals produced under these process conditions are significantly larger, thicker and more regular in shape than the crystals shown in FIGS. 2a and 2b. The calcium sulfite crystals produced when dibasic acid (DBA) (FIGS. 3a and 3b) and succinic acid (FIGS. 4a and 4b) are used as flue gas desulfurization process additives are less platelet-like than the crystals of FIG. 5. However, even the platelet-shaped calcium sulfite crystals of FIG. 5, which were formed when adipic acid was added to the flue gas desulfurization process, are significantly larger and thicker than those of FIG. 2b, which were formed with no organic acid present. The large, thick, regularly-shaped crystals shown in FIGS. 3a, 3b, 4a, 4b and 5 are dewatered and disposed of without the breakage and fines production of the crystals of FIGS. 2a and 2b. Other similar organic acid additives are expected to have substantially the same effect on calcium sulfite crystal formation as the dibasic acid, succinic acid, and adipic acid additives shown in the attached drawings.

The level of organic acid addition to an inhibited oxidation flue gas desulfurization system which will both enhance sulfur dioxide removal and modify calcium sulfite hemihydrate crystals to produce large, thick, block-like crystals that resemble gypsum is 1000 to 2500 ppm. An addition level in this range produces the large regular crystals shown in the drawings and improves settling, dewatering and handling properties of calcium sulfite hemihydrate solids in inhibited oxidation flue gas desulfurization systems so that these properties more closely resemble those of gypsum solids. Additionally, a secondary benefit of improving the settling and dewatering characteristics may be obtained. Since the calcium sulfite hemihydrate solids may be dewatered to a drier state than was previously possible, more liquor can be returned to the system as filtrate recycle 36. As a result, more of the organic acid or any other additive used in the flue gas desulfurization process can be recovered and returned to the system. Therefore, additive consumption rates and, consequently, additive addition rates can be reduced. Additional savings are achieved when the organic acid is also being used to enhance sulfur dioxide removal efficiency. Smaller quantities may be used and, hence, cost savings may be realized for other recoverable flue gas desulfurization process additives.

INDUSTRIAL APPLICABILITY

The flue gas desulfurization process of the present invention will find its primary applicability when it is desired to efficiently and effectively remove sulfur dioxide from flue gas in a wet flue gas desulfurization process conducted under inhibited oxidation conditions to produce easily dewatered calcium sulfite byproduct solids having large regular crystals with improved handling and disposal characteristics, while realizing additive cost savings.

We claim:

1. A slurry wet flue gas desulfurization process conducted under conditions which inhibit the oxidation of calcium sulfite to calcium sulfate which employs an organic acid additive in said slurry to enhance the removal of sulfur dioxide from a sulfur dioxide-containing flue gas and to modify the crystal size and shape of the calcium sulfite solids produced by said flue gas desulfurization process, said process comprising the steps of:

(a) producing a sulfur dioxide and carboxylic acid-containing effluent by contacting a sulfur dioxide-containing flue gas in an absorber with a slurry containing an amount of a selected carboxylic acid effective both to enhance the efficiency of the removal of sulfur dioxide from the sulfur dioxide-containing flue gas and to produce by-product solids with large, regular crystals that are effectively dewatered, said carboxylic acid being selected from the group consisting of DBA, succinic acid, adipic acid and glutaric acid;

(b) directing the effluent to a reaction tank containing a solution including lime or limestone and an oxidation inhibitor comprising a source of thiosulfate ions and producing a slurry containing a calcium sulfite precipitate;

(c) adding to said reaction tank an amount of said selected carboxylic acid sufficient both to produce calcium sulfite crystals in said calcium sulfite precipitate that are larger, thicker and more regularly shaped than calcium sulfite crystals produced in the absence of said selected carboxylic acid and to enhance sulfur dioxide removal efficiency;

(d) recirculating a slurry portion of the carboxylic acid-containing slurry from said reaction tank to the absorber to remove sulfur dioxide from sulfur dioxide-containing flue gas;

(e) directing a calcium sulfite solids-containing portion of said slurry to dewatering apparatus and separating calcium sulfite solids characterized by large, thick, regularly shaped crystals substantially similar in size and shape to gypsum crystals from said slurry, leaving a liquor fraction containing at least said selected carboxylic acid; and (f) recycling said carboxylic acid-containing liquor fraction to the reaction tank.

2. The wet flue gas desulfurization process described in claim 1, wherein 1000–2500 ppm of the selected carboxylic acid DBA is added to said reaction tank.

3. The wet flue gas desulfurization process described in claim 1, wherein 1000–2500 ppm of the selected carboxylic acid succinic acid is added to said reaction tank.

4. The wet flue gas desulfurization process described in claim 1, wherein 1000–2500 ppm of the selected carboxylic acid adipic acid is added to said reaction tank.

5. The wet flue gas desulfurization process described in claim 1, wherein 1000 to 2500 ppm of said selected carboxylic acid contacts said sulfur dioxide-containing flue gas in the absorber.

* * * * *